(12) United States Patent
Liu et al.

(10) Patent No.: US 11,678,322 B2
(45) Date of Patent: Jun. 13, 2023

(54) SCHEDULING REQUEST TRANSMISSION METHOD AND APPARATUS, AND STORAGE MEDIUM

(71) Applicant: BEIJING XIAOMI MOBILE SOFTWARE CO., LTD., Beijing (CN)

(72) Inventors: Chunhua Liu, Beijing (CN); Mingju Li, Beijing (CN); Yajun Zhu, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 75 days.

(21) Appl. No.: 17/267,412

(22) PCT Filed: Aug. 17, 2018

(86) PCT No.: PCT/CN2018/101077
§ 371 (c)(1),
(2) Date: Feb. 9, 2021

(87) PCT Pub. No.: WO2020/034196
PCT Pub. Date: Feb. 20, 2020

(65) Prior Publication Data
US 2021/0307038 A1   Sep. 30, 2021

(51) Int. Cl.
*H04W 72/1268* (2023.01)
*H04W 76/19* (2018.01)
(Continued)

(52) U.S. Cl.
CPC ...... *H04W 72/1268* (2013.01); *H04B 7/0695* (2013.01); *H04L 27/2607* (2013.01); *H04W 72/0446* (2013.01); *H04W 76/19* (2018.02)

(58) Field of Classification Search
CPC ......... H04W 72/1268; H04W 72/0446; H04W 76/19; H04W 72/1284; H04W 72/12;
(Continued)

(56) References Cited

U.S. PATENT DOCUMENTS

2017/0222856 A1   8/2017 Dinan
2018/0279363 A1*  9/2018 Su .................... H04L 1/08
(Continued)

FOREIGN PATENT DOCUMENTS

CN   102006107 A   4/2011
CN   108347786 A   7/2018
(Continued)

OTHER PUBLICATIONS

International Search Report in the International application No. PCT/CN2018/101077, dated Mar. 28, 2019, 2 pgs.
(Continued)

*Primary Examiner* — Thinh D Tran
(74) *Attorney, Agent, or Firm* — Cooper Legal Group, LLC

(57) ABSTRACT

Provided are a method and apparatus for transmitting a Scheduling Request (SR) and a storage medium. The method includes: before sending an SR to a base station through a Physical Uplink Control Channel (PUCCH), determining a preset parameter for generating an SR sequence based on the SR and a PUCCH format for sending the SR, the preset parameter corresponding to a transmission manner of the SR and the PUCCH format, the transmission manner of the SR including that a first SR is transmitted, a second SR is transmitted and both the first SR and the second SR are transmitted simultaneously, and the first SR and the second SR being different types of SRs; generating the SR sequence based on the preset parameter; and sending the SR sequence to the base station. Accordingly, the terminal can transmit two types of SRs simultaneously without additionally increasing the SR resource.

12 Claims, 17 Drawing Sheets

(51) Int. Cl.
    *H04B 7/06*    (2006.01)
    *H04L 27/26*    (2006.01)
    *H04W 72/0446*    (2023.01)

(58) Field of Classification Search
    CPC ............. H04W 72/1205; H04B 7/0695; H04L 27/2607
    See application file for complete search history.

(56) References Cited

U.S. PATENT DOCUMENTS

| | | | |
|---|---|---|---|
| 2018/0324787 A1* | 11/2018 | Yin | H04W 72/0413 |
| 2019/0028318 A1* | 1/2019 | Chakraborty | H04L 1/0058 |
| 2020/0029348 A1* | 1/2020 | Gao | H04L 1/00 |
| 2020/0177424 A1* | 6/2020 | Noh | H04L 5/0055 |
| 2020/0178242 A1* | 6/2020 | Yamamoto | H04L 5/0055 |

FOREIGN PATENT DOCUMENTS

| | | |
|---|---|---|
| CN | 108347787 A | 7/2018 |
| WO | 2010133042 A1 | 11/2010 |

OTHER PUBLICATIONS

English translation of the Written Opinion of the International Search Authority in the international application No. PCT/CN2018/101077, dated Mar. 28, 2019, 4 pgs.

First Office Action of the Chinese application No. 201880001425.0, dated Apr. 30, 2021, 22 pgs.

"Physical Channels and Modulation", Jun. 2018, 3GPP TS 38.211 V15.2.0, 3rd Generation Partnership Project; Technical Specification Group Radio Access Network, Release 15, 93 pgs.

"Physical Layer Procedures for Control", Jun. 2018, 3GPP TS 38.211 V15.2.0, 3rd Generation Partnership Project; Technical Specification Group Radio Access Network, Release 15, 98 pgs.

* cited by examiner

SCHEDULING REQUEST TRANSMISSION METHOD AND APPARATUS, AND STORAGE MEDIUM

CROSS-REFERENCE TO RELATED APPLICATION

This application is a US national stage of International Patent Application No. PCT/CN2018/101077, filed on Aug. 17, 2018, the content of which is incorporated herein by reference in its entirety.

TECHNICAL FIELD

The present disclosure relates to the technical field of communications, and more particularly, to a method and apparatus for transmitting a Scheduling Request (SR) and a storage medium.

BACKGROUND

In related art, User Equipment (UE) can only have one SR resource at a same moment, and this SR resource can only be used to transmit one type of SR. When UE has uplink buffer data to be sent, i.e., the UE needs to send an UpLink-Scheduling Request (UL-SR), and the UE further needs to send another type of SR, such as a Beam Failure Recovery Request (BFRQ), to a base station, the UE can only transmit either the BFR_SR or the UL_SR, which may result in that the other SR is delayed to be sent.

SUMMARY

In order to overcome the problem in the related art, the present disclosure provides a method and apparatus for transmitting an SR and a storage medium.

According to a first aspect of the present disclosure, a method for transmitting an SR is provided. The method may be applied to a terminal, and include that: before an SR is sent to a base station through a Physical Uplink Control Channel (PUCCH), a preset parameter for generating an SR sequence is determined based on the SR and a PUCCH format for sending the SR, the preset parameter corresponding to a transmission manner of the SR and the PUCCH format, the transmission manner of the SR including that: a first SR is transmitted, a second SR is transmitted and both the first SR and the second SR are transmitted simultaneously, and the first SR and the second SR being different types of SRs; the SR sequence is generated based on the preset parameter; and the SR sequence is sent to the base station.

Optionally, the preset parameter may include a preset cyclic shift and a preset information block, and the operation that the preset parameter for generating the SR sequence is determined based on the SR and the PUCCH format for sending the SR may include that: when the PUCCH format for sending the SR is a first predefined format, a preset cyclic shift corresponding to the transmission manner of the SR is determined as the preset parameter for generating the SR sequence.

Optionally, the operation that the SR sequence is generated based on the preset parameter may include that: the SR sequence is generated based on the preset cyclic shift, an initial cyclic shift corresponding to the first predefined format and a time-domain position of the SR sequence in an SR resource.

Optionally, the preset parameter may include a preset cyclic shift and a preset information block, and the operation that the preset parameter for generating the SR sequence is determined based on the SR and the PUCCH format for sending the SR may include that: when the PUCCH format for sending the SR is a second predefined format, a preset information block corresponding to the transmission manner of the SR is determined as the preset parameter for generating the SR sequence, the preset information block including at least two bits.

Optionally, the operation that the SR sequence is generated based on the preset parameter may include that: modulation is performed on the preset information block to obtain a symbol; an original sequence is calculated based on a time-domain position of the SR sequence in an SR resource, an initial cyclic shift corresponding to the second predefined format and a preset quadrature sequence; and the original sequence is multiplied by the symbol obtained by the modulation to obtain the SR sequence.

Optionally, the method may further include that: control signaling sent by the base station is received, the control signaling indicating a type of each preset parameter corresponding to each predefined PUCCH format, and a value of each preset parameter corresponding to each transmission manner under each predefined PUCCH format.

Optionally, the type of each preset parameter corresponding to each predefined PUCCH format and the value of each preset parameter corresponding to each transmission manner under each predefined PUCCH format may be pre-stored in the terminal.

Optionally, the first SR may be an uplink SR and the second SR may be a BFRQ.

According to a second aspect of the present disclosure, a method for transmitting an SR is provided. The method may be applied to a base station, and include that: an SR sequence is acquired; a preset parameter for generating the SR sequence is determined based on the SR sequence and a PUCCH format for transmitting the SR sequence, the preset parameter corresponding to a transmission manner of the SR and the PUCCH format, the transmission manner of the SR including that: a first SR is transmitted, a second SR is transmitted and both the first SR and the second SR are transmitted simultaneously, and the first SR and the second SR being different types of SRs; and a content requested by a terminal sending the SR sequence is determined based on the preset parameter.

Optionally, the preset parameter may include a preset cyclic shift and a preset information block, and the operation that the preset parameter for generating the SR sequence is determined based on the SR sequence and the PUCCH format for transmitting the SR sequence may include that: at least one reference SR sequence is generated based on at least one preset cyclic shift when the PUCCH format is a first predefined format; consistencies between reference SR sequences and the received SR sequence are compared; and a preset cyclic shift corresponding to a reference SR sequence having highest consistency with the received SR sequence is determined as a preset cyclic shift for generating the received SR sequence.

Optionally, the preset parameter may include a preset cyclic shift and a preset information block, and the operation that the preset parameter for generating the SR sequence is determined based on the SR sequence and the PUCCH format for transmitting the SR sequence may include that: the SR sequence is associated with an original sequence when the PUCCH format is a second predefined format to obtain a target value; the target value is mapped to a first constellation point in a constellation map; a second constellation point closest to the first constellation point is determined from all standard constellation points in the constellation map, each standard constellation point corresponding to each preset information block, and each preset information block at least including two bits; and a preset information block corresponding to the second constellation point is determined as an information block for generating the received SR sequence.

Optionally, the method may further include that: control signaling is sent to the terminal, the control signaling including a predefined PUCCH format, the transmission manner of the SR and types of different preset parameters corresponding to different transmission manners.

Optionally, the first SR may be an uplink SR and the second SR may be a BFRQ.

According to a third aspect of the present disclosure, an apparatus for transmitting an SR is provided. The apparatus may be applied to a terminal and include: a first determination module, configured to determine, before sending an SR to a base station through a PUCCH, based on the SR and a PUCCH format for sending the SR, a preset parameter for generating an SR sequence, the preset parameter corresponding to a transmission manner of the SR and the PUCCH format, the transmission manner of the SR including that: a first SR is transmitted, a second SR is transmitted and both the first SR and the second SR are transmitted simultaneously, and the first SR and the second SR being different types of SRs; a generation module, configured to generate the SR sequence based on the preset parameter; and a sending module, configured to send the SR sequence to the base station.

Optionally, the preset parameter may include a preset cyclic shift and a preset information block, and the first determination module includes: a first determination submodule, configured to determine, when the PUCCH format for sending the SR is a first predefined format, a preset cyclic shift corresponding to the transmission manner of the SR as the preset parameter for generating the SR sequence.

Optionally, the generation module may include: a first generation submodule, configured to generate the SR sequence based on the preset cyclic shift, an initial cyclic shift corresponding to the first predefined format and a time-domain position of the SR sequence in an SR resource.

Optionally, the preset parameter may include a preset cyclic shift and a preset information block, and the first determination module may include: a second determination submodule, configured to determine, when the PUCCH format for sending the SR is a second predefined format, a preset information block corresponding to the transmission manner of the SR as the preset parameter for generating the SR sequence, the preset information block including at least two bits.

Optionally, the generation module may include: a modulation submodule, configured to perform modulation on the preset information block to obtain a symbol; a first calculation submodule, configured to calculate an original sequence based on a time-domain position of the SR sequence in an SR resource, an initial cyclic shift corresponding to the second predefined format and a preset quadrature sequence; and a second calculation submodule, configured to multiply the original sequence by the symbol obtained by the modulation to obtain the SR sequence.

Optionally, the apparatus may further include: a receiving module, configured to receive control signaling from the base station, the control signaling indicating a type of each preset parameter corresponding to each predefined PUCCH format, and a value of each preset parameter corresponding to each transmission manner under each predefined PUCCH format.

Optionally, the type of each preset parameter corresponding to each predefined PUCCH format and the value of each preset parameter corresponding to each transmission manner under each predefined PUCCH format may be pre-stored in the terminal.

Optionally, the first SR may be an uplink SR and the second SR may be a B Q.

According to a fourth aspect of the present disclosure, an apparatus for transmitting an SR is provided. The apparatus may be applied to a base station and include: an acquisition module, configured to acquire an SR sequence; a second determination module, configured to determine, based on the SR sequence and a PUCCH format for transmitting the SR sequence, a preset parameter for generating the SR sequence, the preset parameter corresponding to a transmission manner of the SR and the PUCCH format, the transmission manner of the SR including that: a first SR is transmitted, a second SR is transmitted and both the first SR and the second SR are transmitted simultaneously, and the first SR and the second SR being different types of SRs; and a third determination module, configured to determine, based on the preset parameter, a content requested by a terminal sending the SR sequence.

Optionally, the preset parameter may include a preset cyclic shift and a preset information block, and the second determination module may include: a second generation submodule, configured to generate at least one reference SR sequence based on at least one preset cyclic shift when the PUCCH format is a first predefined format; a comparison submodule, configured to compare consistencies between reference SR sequences and the received SR sequence; and a third determination submodule, configured to determine a preset cyclic shift corresponding to a reference SR sequence having highest consistency with the received SR sequence as a preset cyclic shift for generating the received SR sequence.

Optionally, the preset parameter may include a preset cyclic shift and a preset information block, and the second determination module may include: an association submodule, configured to associate the SR sequence with an original sequence when the PUCCH format is a second predefined format to obtain a target value; a mapping submodule, configured to map the target value to a first constellation point in a constellation map; a fourth determination submodule, configured to determine a second constellation point closest to the first constellation point among all standard constellation points in the constellation map, each standard constellation point corresponding to each preset information block, and each preset information block at least including two bits; and a fifth determination submodule, configured to determine a preset information block corresponding to the second constellation point as an information block for generating the received SR sequence.

Optionally, the apparatus may further include: a sending module, configured to send control signaling to the terminal, the control signaling including a predefined PUCCH format, the transmission manner of the SR and types of different preset parameters corresponding to different transmission manners.

Optionally, the first SR may be an uplink SR and the second SR may be a BFRQ.

According to a fifth aspect of the present disclosure, an apparatus for transmitting an SR is provided. The apparatus may include: a processor; and a memory configured to store instructions executable for the processor; and the processor is configured to determine, before sending an SR to a base station through a PUCCH, based on the SR and a PUCCH format for sending the SR, a preset parameter for generating an SR sequence, the preset parameter corresponding to a transmission manner of the SR and the PUCCH format, the transmission manner of the SR including that: a first SR is transmitted, a second SR is transmitted and both the first SR and the second SR are transmitted simultaneously, and the first SR and the second SR being different types of SRs; generate the SR sequence based on the preset parameter; and send the SR sequence to the base station.

According to a sixth aspect of the present disclosure, a non-temporary computer-readable storage medium is provided, which has stored instructions that, when executed by a processor, cause the processor to implement the method according to the first aspect of the present disclosure.

According to a seventh aspect of the present disclosure, an apparatus for transmitting an SR is provided. The apparatus may include: a processor; and a memory, configured to store instructions executable for the processor; and the processor is configured to: acquire an SR sequence; determine, based on the SR sequence and a PUCCH format for transmitting the SR sequence, a preset parameter for generating the SR sequence, the preset parameter corresponding to a transmission manner of the SR and the PUCCH format, the transmission manner of the SR including that: a first SR is transmitted, a second SR is transmitted and both the first SR and the second SR are transmitted simultaneously, and the first SR and the second SR being different types of SRs; and determine, based on the preset parameter, a content requested by a terminal sending the SR sequence.

According to an eighth aspect of the present disclosure, a non-temporary computer-readable storage medium is provided, which has stored instructions that, when executed by a processor, cause the processor to implement the method according to the second aspect of the present disclosure.

The technical solutions provided by the embodiments of the present disclosure may have the following beneficial effects.

According to the method for transmitting an SR provided by the embodiments of the present disclosure, a terminal may determine a preset parameter for generating the SR based on an SR sent to a base station and a PUCCH channel format for sending the SR. The preset parameter corresponds to a transmission manner of the SR and the PUCCH format for sending the SR, and the transmission manner of the SR includes two types including that one SR is transmitted and two different types of SRs are transmitted simultaneously, therefore, the terminal can transmit two types of SRs simultaneously without additionally increasing any SR resource.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
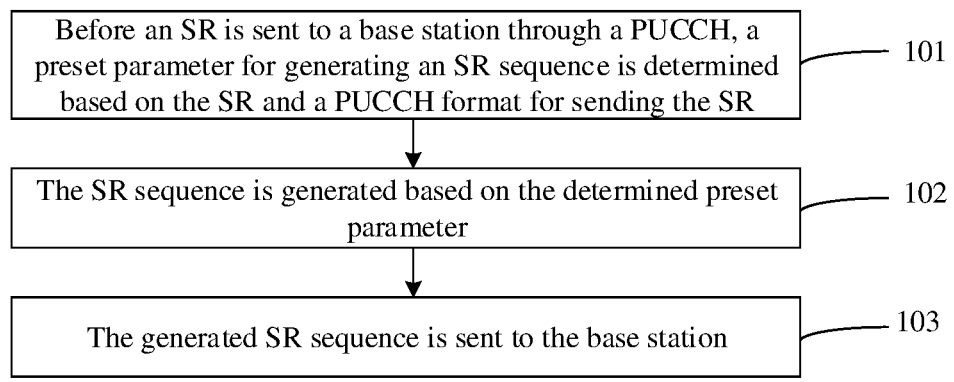
FIG. 1 illustrates a flowchart of a method for transmitting an SR according to an exemplary embodiment.

FIG. 1 illustrates a flowchart of a method for transmitting an SR according to an exemplary embodiment. The method is applied to a terminal, i.e., the method may be executed by a terminal. As shown in FIG. 1, the method includes the following operations.

In operation 101, before an SR is sent to a base station through a PUCCH, a preset parameter for generating an SR sequence is determined based on the SR and a PUCCH format for sending the SR, the preset parameter corresponding to a transmission manner of the SR and the PUCCH format for sending the SR, the transmission manner of the SR including that a first SR is transmitted, a second SR is transmitted and both the first SR and the second SR are transmitted simultaneously, and the first SR and the second SR being different types of SRs.

The PUCCH format for sending the SR may be a PUCCH format that is indicated by the base station to the terminal for sending the SR.

In an implementation, the corresponding relationship between the preset parameter and the transmission manner of the SR as well as the PUCCH format may be indicated by the base station to the terminal, or may be negotiated by the base station and the terminal.

In an implementation, different PUCCH formats may correspond to different types of preset parameters. For example, supposing that the preset parameter includes a cyclic shift and an information block that are both preset, the PUCCH format may include a first predefined format and a second predefined format, the preset parameter corresponding to the first predefined format may be the cyclic shift, and the preset parameter corresponding to the second predefined format may be the information block. For example, the first predefined format may be referred to as PUCCH format 0b, and an SR sequence generating manner and a resource mapping manner both corresponding to the first predefined format may be the same as an SR sequence generating manner and a resource mapping manner both corresponding to PUCCH format 0. The second predefined format may be referred to as PUCCH format 1b. An SR sequence generating manner and a resource mapping manner both corresponding to the second predefined format may be the same as an SR sequence generating manner and a resource mapping manner both corresponding to PUCCH format 1.

In an implementation, the transmission manner of the SR may be determined based on information that presently needs to be transmitted by the terminal. For example, when the terminal presently needs to send the first SR only to the base station, it can be determined that the transmission manner of the SR is transmitting the first SR; when the terminal presently needs to send the second SR only to the base station, it can be determined that the transmission manner of the SR is transmitting the second SR; and when the terminal presently needs to send the first SR and the second SR to the base station simultaneously, it can be determined that the transmission manner of the SR is transmitting the first SR and the second SR simultaneously.

In operation 102, the SR sequence is generated based on the determined preset parameter.

In operation 103, the generated SR sequence is sent to the base station.

According to the method for transmitting an SR provided by the embodiment of the present disclosure, a terminal may determine, based on an SR sent to a base station and a PUCCH channel format for sending the SR, a preset parameter for generating the SR. As the preset parameter corresponds to a transmission manner of the SR and the PUCCH format for sending the SR, and the transmission manner of the SR includes that one SR is transmitted and two different types of SRs are transmitted simultaneously, the terminal can transmit two types of SRs simultaneously without additionally increasing the SR resource.

Figure 2:
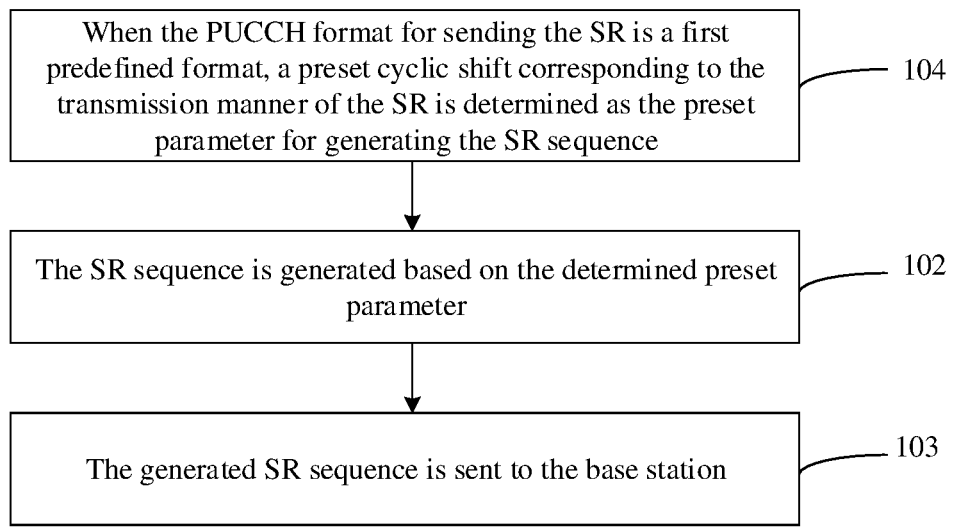
FIG. 2 illustrates a flowchart of a method for transmitting an SR according to an exemplary embodiment.

FIG. 2 illustrates a flowchart of a method for transmitting an SR according to an exemplary embodiment. As shown in FIG. 2, in the method, the preset parameter may include a preset cyclic shift and a preset information block, and on this basis, the operation that the preset parameter for generating the SR sequence is determined based on the SR and the PUCCH format for transmitting the SR may include that: in operation 104, when the PUCCH format for sending the SR is a first predefined format, a preset cyclic shift corresponding to the transmission manner of the SR is determined as the preset parameter for generating the SR sequence. When the PUCCH format for sending the SR is the first predefined format, corresponding relationships between various different scenarios where the terminal sends the SR to the base station and the cyclic shifts may be as shown in the following table 1.

| | Whether to send UL_SR | Whether to send BFR_SR | Cyclic shift of the sequence |
|---|---|---|---|
| Scenario I | Yes | Yes | $m_{cs} = 0$ |
| Scenario II | Yes | No | $m_{cs} = 4$ |
| Scenario III | No | Yes | $m_{cs} = 8$ |
| Scenario IV | No | No | N/A |

In Table 1, the scenario I corresponds to the transmission manner that both the UL_SR and the BFR_SR are transmitted simultaneously, the scenario II corresponds to the transmission manner that the UL_SR (which is an example of the first SR) is transmitted, the scenario III corresponds to the transmission manner that the BFR_SR (which is an example of the second SR) is transmitted, the BFR_SR representing the BFRQ, and the scenario IV represents that no data are transmitted on the SR resource. As can be seen from Table 1, when the transmission manner of the SR is to transmit both the UL_SR and the BFR_SR simultaneously, i.e., the terminal is to send the UL_SR and the BFR_SR to the base station simultaneously, the value of the cyclic shift me, for generating the SR sequence is 0; when the transmission manner of the SR is to transmit the UL_SR only, i.e., the terminal is only to send the UL_SR to the base station, the value of the cyclic shift $m_{cs}$ for generating the SR sequence is 4; when the transmission manner of the SR is to transmit the BFR_SR only, i.e., the terminal is only to send the BFR_SR to the base station, the value of the cyclic shift $m_{cs}$ for generating the SR sequence is 8; and when the terminal sends neither the UL_SR nor the BFR_SR, the terminal does not perform any operation. It is to be noted that in a case where different SR transmission manners correspond to different values of the $m_{cs}$, the value of the $m_{cs}$ may be any integer between 0 and 11.

Figure 3:
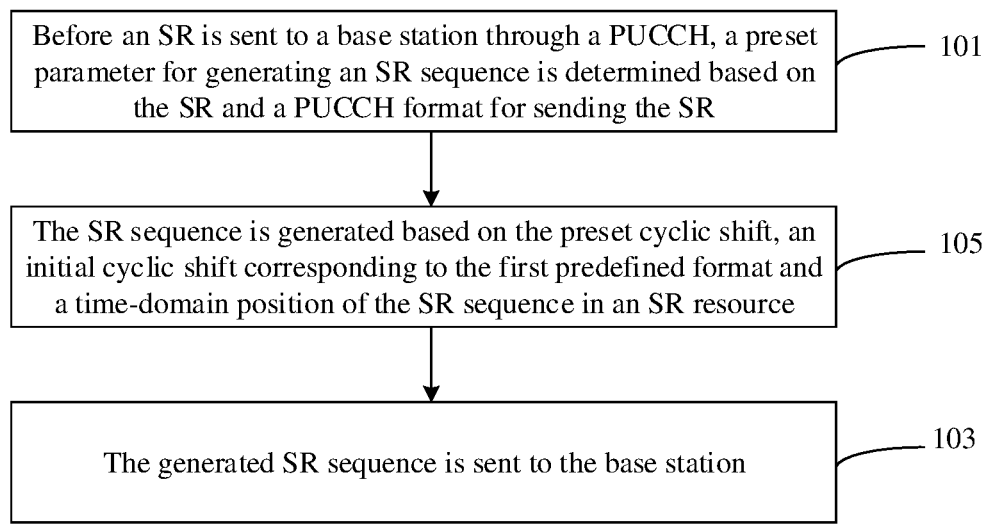
FIG. 3 illustrates a flowchart of a method for transmitting an SR according to an exemplary embodiment.

FIG. 3 illustrates a flowchart of a method for transmitting an SR according to an exemplary embodiment. As shown in FIG. 3, in the method, the operation that the SR sequence is generated based on the determined preset parameter may include that: in operation 105, the SR sequence is generated based on the preset cyclic shift, an initial cyclic shift corresponding to the first predefined format and a time-domain position of the SR sequence in an SR resource. The initial cyclic shift may be an initial cyclic shift allocated by the base station to the terminal in advance and corresponding to the first predefined format, or may be an initial cyclic shift negotiated by the base station and the terminal in advance and corresponding to the first predefined format. When the terminal sends the SR to the base station with the PUCCH format 0b, a SR sequence generating manner defined in the PUCCH format 0b may be used to generate the SR sequence. The initial cyclic shift may be used to distinguish different users/terminals; and the cyclic shift may be used to distinguish specific information transmitted by the terminal, and may be, for example, used to distinguish whether the information transmitted by the terminal is the uplink SR or the BFRQ. The SR sequence may at most support 12 cyclic shifts and each terminal may include the above three transmission manners. Hence, at most four terminals can transmit messages of the PUCCH format 0b on one Resource Block (RB) simultaneously, and there is a need to guarantee that all combinations of the cyclic shifts and the initial cyclic shifts of the four terminals are not the same.

Figure 4:
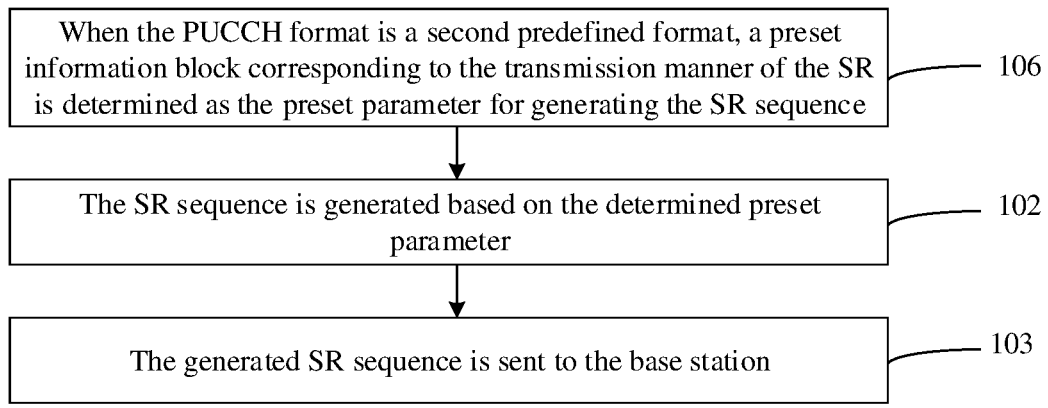
FIG. 4 illustrates a flowchart of a method for transmitting an SR according to an exemplary embodiment.

FIG. 4 illustrates a flowchart of a method for transmitting an SR according to an exemplary embodiment. In the method, the preset parameter may include a preset cyclic shift and a preset information block. As shown in FIG. 4, in the method, the operation that the preset parameter for generating the SR sequence is determined based on the SR and the PUCCH format for transmitting the SR may include that: in operation 106, when the PUCCH format is a second predefined format, a preset information block corresponding to the transmission manner of the SR is determined as the preset parameter for generating the SR sequence, the preset information block including at least two bits. The second predefined format may be, for example, PUCCH format 1b. When the PUCCH format for sending the SR is the second predefined format, corresponding relationships between various different scenarios where the terminal sends the SR to the base station and information blocks may be as shown in the following table 2.

TABLE 2

|  | Whether to send UL_SR | Whether to send BFR_SR | Information block (b(0)b(l)) |
| --- | --- | --- | --- |
| Scenario I | Yes | Yes | 10 |
| Scenario II | Yes | No | 00 |
| Scenario III | No | Yes | 11 |
| Scenario IV | No | No | N/A |

In Table 2, the scenario I corresponds to the transmission manner that both the UL_SR and the BFR_SR are transmitted simultaneously, the scenario II corresponds to the transmission manner that the UL_SR is transmitted, the scenario III corresponds to the transmission manner that the BFR_SR is transmitted, and the scenario IV represents that no data are transmitted on the SR resource. As can be seen from Table 2, when the transmission manner of the SR is to transmit both the UL_SR and the BFR_SR simultaneously, i.e., the terminal is to send the UL_SR and the BFR_SR to the base station simultaneously, the value of the information block for generating the SR sequence is 10; when the transmission manner of the SR is to only transmit the UL_SR, i.e., the terminal is only to send the UL_SR to the base station, the value of the information block for generating the SR sequence is 00; when the transmission manner of the SR is to only transmit the BFR_SR, i.e., the terminal is only to send the BFR_SR to the base station, the value of the information block for generating the SR sequence is 11; and when the terminal sends neither the UL_SR nor the BFR_SR, the terminal does not perform any operation.

Figure 5:
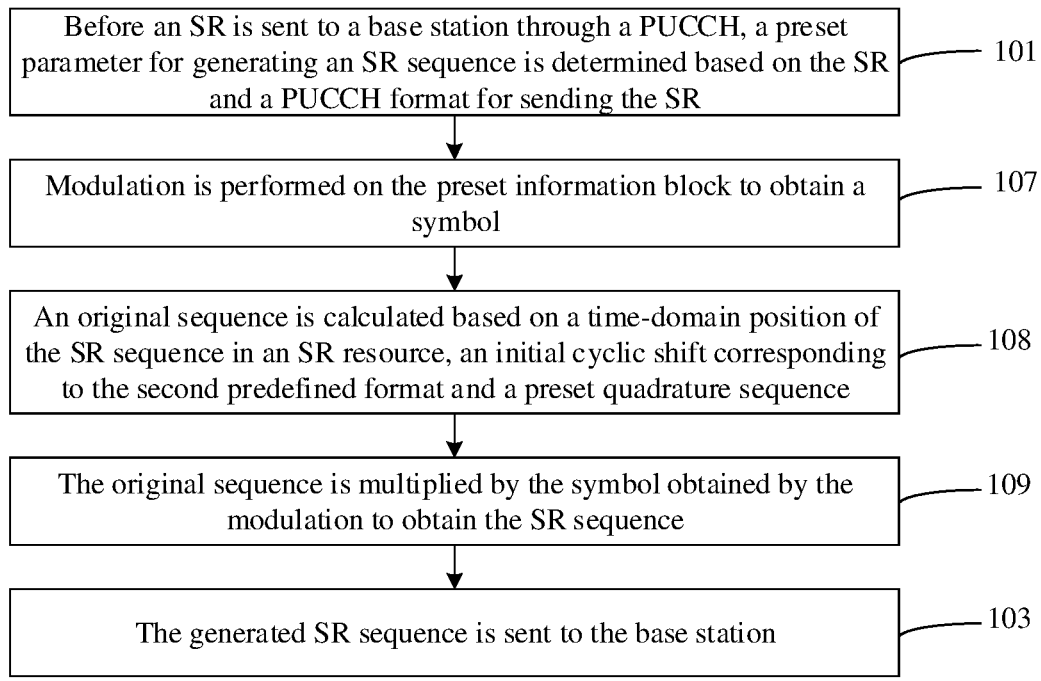
FIG. 5 illustrates a flowchart of a method for transmitting an SR according to an exemplary embodiment.

FIG. 5 illustrates a flowchart of a method for transmitting an SR according to an exemplary embodiment. As shown in FIG. 5, in the method, the operation that the SR sequence is generated based on the preset parameter may include following operations. In operation 107, modulation is performed on the preset information block to obtain a symbol, for example, when the preset information block is an information block with one bit, Binary Phase Shift Keying (BPSK) modulation may be performed on the information block, and when the preset information block is an information block with two bits, Quadrature Phase Shift Keying (QPSK) modulation may be performed on the information block. In operation 108, an original sequence is calculated based on a time-domain position of the SR sequence in an SR resource, an initial cyclic shift corresponding to the second predefined format and a preset quadrature sequence, for example, the original sequence may be generated in an original sequence generating manner defined in the PUCCH format 1. The initial cyclic shift corresponding to the second predefined format may be an initial cyclic shift allocated by the base station to the terminal in advance and corresponding to the second predefined format, or may be an initial cyclic shift negotiated by the base station and the terminal in advance and corresponding to the second predefined format. In operation 109, the original sequence is multiplied by the symbol obtained by the modulation to obtain the SR sequence. The preset information block may be a preset information block allocated by the base station to the terminal in advance and corresponding to the second predefined format, or may be a preset information block negotiated by the base station and the terminal in advance and corresponding to the second predefined format. The quadrature sequence may be a sequence allocated by the base station to the terminal through Radio Resource Control Wireless (RRC) control signaling or Medium/Media Access Control (MAC) Control Element (CE) signaling and dedicated to the terminal for generating the original base sequence.

Figure 6:
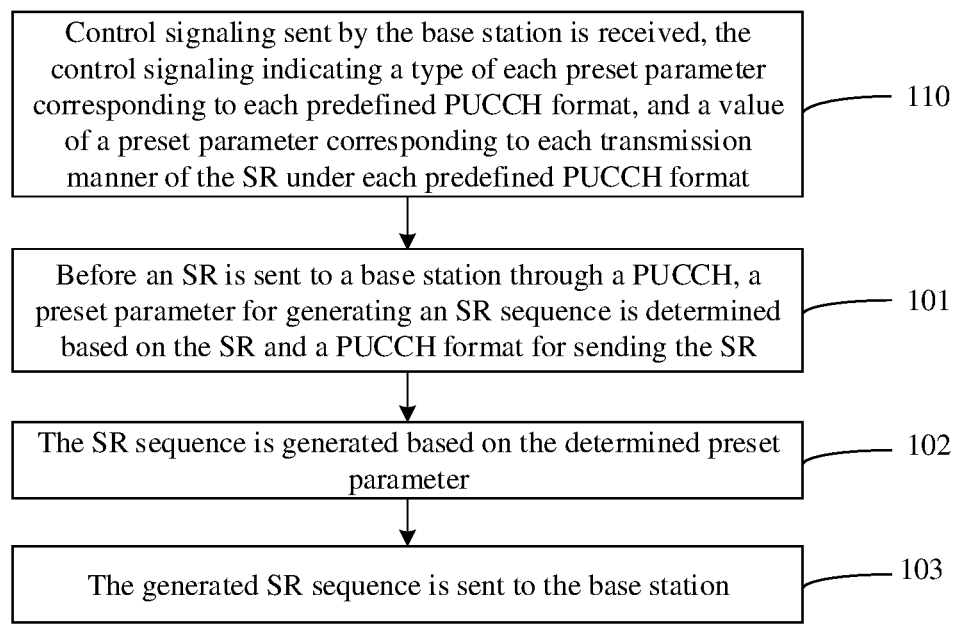
FIG. 6 illustrates a flowchart of a method for transmitting an SR according to an exemplary embodiment.

FIG. 6 illustrates a flowchart of a method for transmitting an SR according to an exemplary embodiment. As shown in FIG. 6, on the basis of the method shown in FIG. 1, the method may further include that: in operation 110, control signaling sent by the base station is received, the control signaling indicating a type of each preset parameter corresponding to each predefined PUCCH format, and a value of a preset parameter corresponding to each transmission manner of the SR under each predefined PUCCH format. For example, the control signaling may indicate the contents in the above Table 1 and/or Table 2. In addition, the control signaling may further include an identifier of the terminal. The control signaling may be, for example, RRC signaling or MAC CE signaling. It is to be noted that the execution sequence between the operation 110 and the operation 101, the operation 102 as well as operation 103 is not limited in the embodiments. FIG. 6 merely shows one situation that the operation 110 is executed before the operation 101, the operation 102 and the operation 103.

In a possible implementation, the terminal may pre-store the type of each preset parameter corresponding to each predefined PUCCH format, and the value of a preset parameter corresponding to each transmission manner of the SR under each predefined PUCCH format. For example, the terminal may pre-store the contents in the above Table 1 and/or Table 2. Correspondingly, as the base station needs to determine, based on the received SR sequence sent by the terminal, the content requested by the terminal, the base station may also store these contents. Or, the terminal and the base station may transmit the SR based on a communication protocol, and these contents may be specified in the communication protocol.

In a possible implementation, the first SR may be an uplink SR, and the second SR may be a BFRQ. For example, when the SR resource of the terminal periodically comes and the SR needs to be transmitted through the PUCCH format 0b, the terminal may determine, based on the SR to be transmitted presently, the me, for generating the SR sequence based on the above Table 1; when the terminal presently needs to transmit the UL_BFR and the BFR_SR, it may be considered by the terminal that the $m_{cs}$ is 0; when the terminal is to send the UL_BFR only to the base station, it may be considered by the terminal that the $m_{cs}$ is 4; and when the terminal is to send the BFR_SR only to the base station, it may be considered by the terminal that the $m_{cs}$ is 8. When the terminal sends neither the UL_BFR nor the BFR_SR, the terminal does not perform any operation. The terminal may calculate, based on the obtained $m_{cs}$, the time-domain position of the SR resource and the $m_0$ corresponding to the PUCCH format 0b, the SR sequence that needs to be transmitted, and may send the generated SR sequence to the base station on the SR resource. The uplink SR may be a request for requesting an uplink transmission resource from the base station, and the BFRQ may be a request for notifying the base station of that the terminal presently has some beam failure events.

Figure 7:
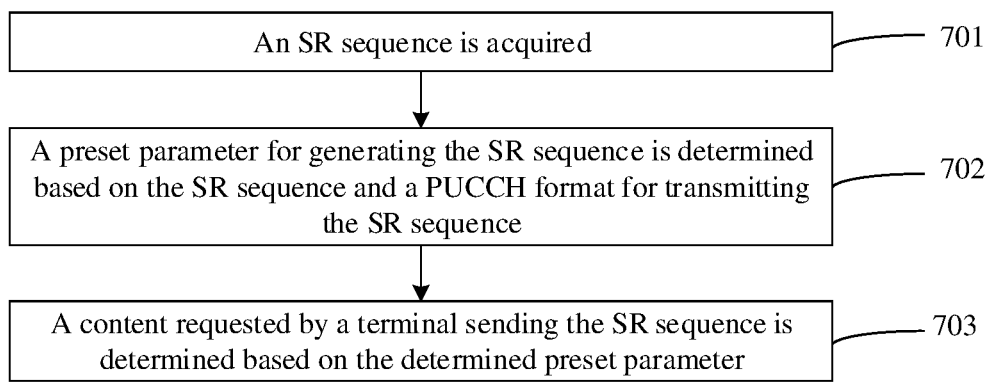
FIG. 7 illustrates a flowchart of a method for transmitting an SR according to an exemplary embodiment.

FIG. 7 illustrates a flowchart of a method for transmitting an SR according to an exemplary embodiment. The method is applied to a base station, i.e., the method may be executed by the base station. As shown in FIG. 7, the method may include the following operations.

In operation 701, an SR sequence is acquired.

For example, the base station may acquire the SR sequence by detecting the sequence transmitted on an SR resource.

In operation 702, a preset parameter for generating the SR sequence is determined based on the SR sequence and a PUCCH format for transmitting the SR sequence, the preset parameter corresponding to a transmission manner of the SR and the PUCCH format for transmitting the SR sequence, the transmission manner of the SR including that: a first SR is transmitted, a second SR is transmitted and both the first SR and the second SR are transmitted simultaneously, and the first SR and the second SR being different types of SRs.

In a possible implementation, the preset parameter for generating the received SR sequence may be determined according to a corresponding relationship between the preset parameter and the transmission manner of the SR as well as the PUCCH format for transmitting the SR sequence. The base station may pre-store the corresponding relationship, and the base station may configure the corresponding relationship for the terminal through RRC signaling or MAC CE signaling. In addition, the corresponding relationship may also be negotiated by the base station and the terminal.

In operation 703, a content requested by a terminal sending the SR sequence is determined based on the determined preset parameter.

In a possible implementation, as the preset parameter corresponds to the transmission manner of the SR, and the above three transmission manners of the SR correspond to the types of transmitted SRs, the base station may know the type of the SR sent by the terminal sending the SR sequence once determining the preset parameter for generating the SR sequence. For example, the SR may be an uplink SR or a BFRQ, so after knowing the type of the SR, the base station may determine the content requested by the terminal sending the SR sequence.

According to the method for transmitting an SR provided by the embodiment of the present disclosure, a terminal may determine, based on a received SR sequence and a PUCCH format for transmitting the SR sequence, a preset parameter for generating the SR sequence, thereby determining a content requested by the terminal sending the SR based on the preset parameter. As the transmission manner of the SR includes that one SR is transmitted and two different types of SRs are transmitted simultaneously, the terminal may identify two different types of SRs simultaneously transmitted by the terminal.

Figure 8:
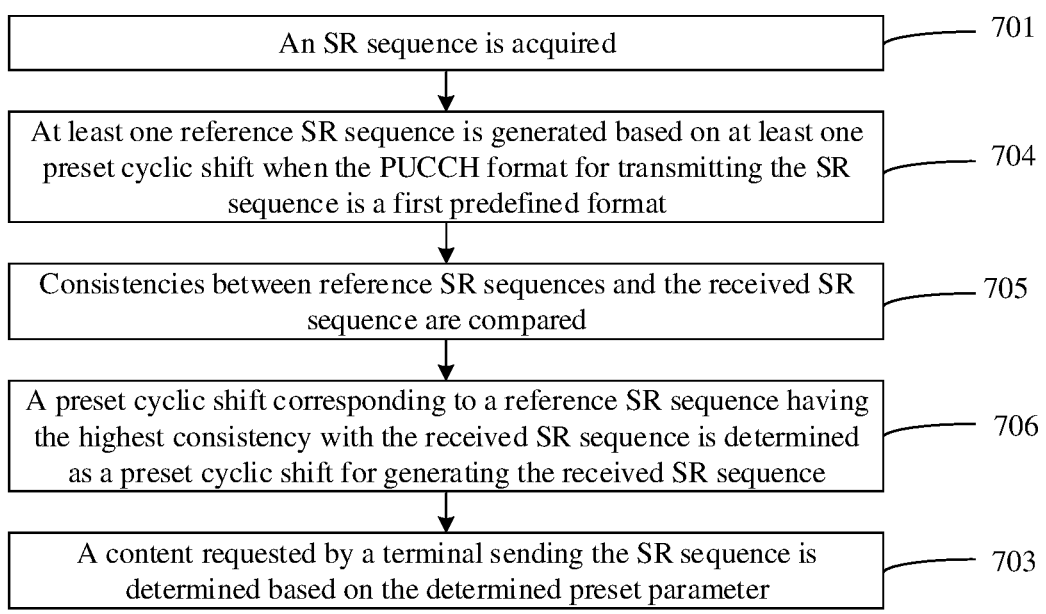
FIG. 8 illustrates a flowchart of a method for transmitting an SR according to an exemplary embodiment.

FIG. 8 illustrates a flowchart of a method for transmitting an SR according to an exemplary embodiment. In the method, the preset parameter may include a preset cyclic shift and a preset information block. As shown in FIG. 8, the operation that the preset parameter for generating the SR sequence is determined based on the SR sequence and the PUCCH format for transmitting the SR sequence may include that: in operation 704, at least one reference SR sequence is generated based on at least one preset cyclic shift when the PUCCH format for transmitting the SR sequence is a first predefined format; in operation 705, consistencies between reference SR sequences and the received SR sequence are compared; and in operation 706, a preset cyclic shift corresponding to a reference SR sequence having the highest consistency with the received SR sequence is determined as a preset cyclic shift for generating the received SR sequence. The at least one cyclic sequence may be a part or all of 12 cyclic shifts supportable to the SR sequence, and may be, for example, three cyclic shifts shown in the above Table 1. Different cyclic shifts correspond to different transmission manners of the SR, and each transmission manner specifies the type of the transmitted SR. Hence, the base station may know the type of the transmitted SR based on the determined cyclic shift; and after knowing the type of the SR, the base station may determine the content requested by the terminal sending the SR. For example, when the SR is an uplink SR, the base station may know that the terminal needs to request an uplink transmission resource; and when the SR is a BFRQ, the base station may know that the terminal requests beam failure recovery.

Figure 9:
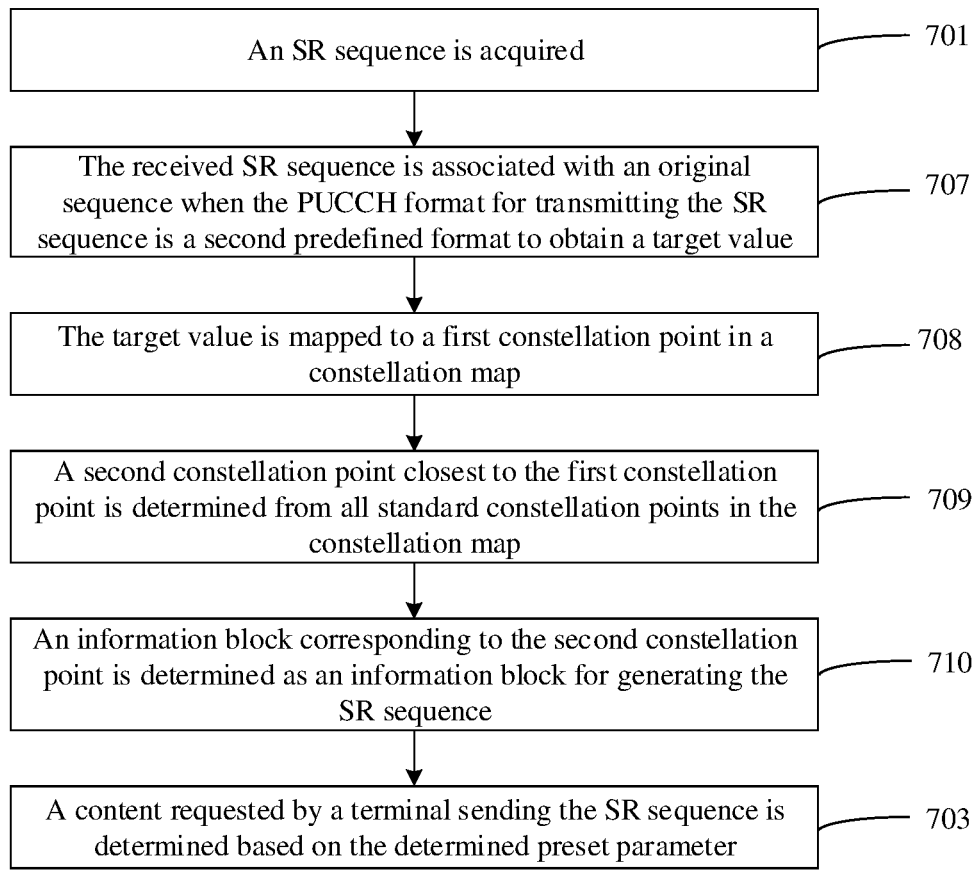
FIG. 9 illustrates a flowchart of a method for transmitting an SR according to an exemplary embodiment.

FIG. 9 illustrates a flowchart of a method for transmitting an SR according to an exemplary embodiment. As shown in FIG. 9, the operation that the preset parameter for generating the SR sequence is determined based on the SR sequence and the PUCCH format for transmitting the SR sequence may include following operations. In operation 707, the received SR sequence is associated with an original sequence when the PUCCH format for transmitting the SR sequence is a second predefined format to obtain a target value. For example, association between the received SR sequence and the original sequence may be calculated, and the association is used as the target value. In operation 708, the target value is mapped to a first constellation point in a constellation map. In operation 709, a second constellation point closest to the first constellation point is determined from all standard constellation points in the constellation map, each standard constellation point corresponding to each preset information block, and each preset information block at least including two bits. Each standard constellation point is a position corresponding to each modulated preset information block on the constellation map. For example, when the preset information block has two bits, each standard constellation point is a position corresponding to each QPSK modulated preset information block on the constellation map. In operation 710, a preset information block corresponding to the second constellation point is determined as an information block for generating the SR sequence. Different information blocks correspond to different transmission manners of the SR, and each transmission manner specifies the type of the transmitted SR. Hence, the base station may know the type of the transmitted SR based on the obtained information block; and after knowing the type of the SR, the base station may determine the content requested by the terminal sending the SR. For example, when the SR is an uplink SR, the base station may know that the terminal needs to request a uplink transmission resource; and when the SR is a BFRQ, the base station may know that the terminal requests beam failure recovery.

Figure 10:
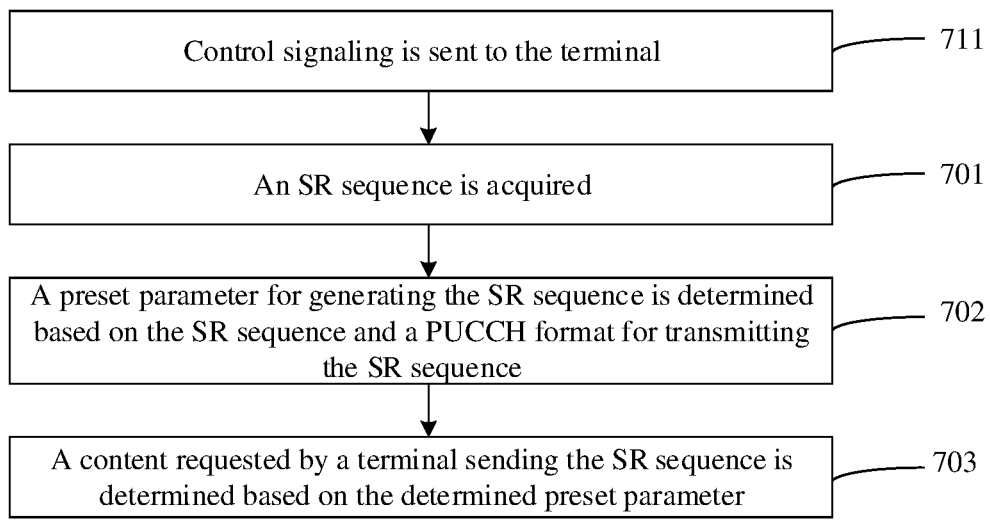
FIG. 10 illustrates a flowchart of a method for transmitting an SR according to an exemplary embodiment.

FIG. 10 illustrates a flowchart of a method for transmitting an SR according to an exemplary embodiment. As shown in FIG. 10, on the basis of the method shown in FIG. 7, the method may further include that: in operation 711, control signaling is sent to the terminal, the control signaling indicating a type of each preset parameter corresponding to each predefined PUCCH format, and a value of a preset parameter corresponding to each transmission manner of the SR in each predefined PUCCH format. For example, the control signaling may indicate that the preset parameter corresponding to the first predefined format is a cyclic shift, and the value of the cyclic shift corresponding to each transmission manner of the SRs may be as shown in the above Table 1, and/or, the control signaling may indicate that the preset parameter corresponding to the second predefined format is a preset information block, and the preset information block corresponding to each transmission manners of the SR may be as shown in the above Table 2. It is to be noted that the execution sequence between the operation 711 and the operation 701, the operation 702 as well as the operation 703 is not limited in the embodiment. FIG. 10 merely shows a situation that the operation 711 is executed before the operation 701, the operation 702 and the operation 703.

In a possible implementation, the first SR may be an uplink SR, and the second SR may be a BFRQ. For example, when the SR resource of the terminal periodically comes and the SR needs to be transmitted through the PUCCH format 1b, the terminal may determine, based on the SR to be transmitted presently, the value of the information block for generating the SR sequence based on the above Table 2; when the terminal presently needs to transmit the UL_BFR and the BFR_SR, it may be determined by the terminal that the value of the information block for generating the SR sequence is 10; when the terminal is to send the UL_BFR only to the base station, it may be determined by the terminal that the value of the information block for generating the SR sequence is 00; and when the terminal is to send the BFR_SR only to the base station, it may be determined by the terminal that the value of the information block for generating the SR sequence is 11. When the terminal sends neither the UL_BFR nor the BFR_SR, the terminal does not perform any operation. The terminal may perform QPSK modulation on the obtained information block to obtain a symbol d. The terminal calculates an original sequence based on a time-domain position of the SR resource for sending the SR sequence, an initial cyclic shift corresponding to the PUCCH format 1b and a quadrature sequence pre-configured by the base station to the terminal. The terminal may multiply the original sequence by the symbol d to obtain the SR sequence. The SR sequence may be transmitted on the SR resource.

Figure 11:
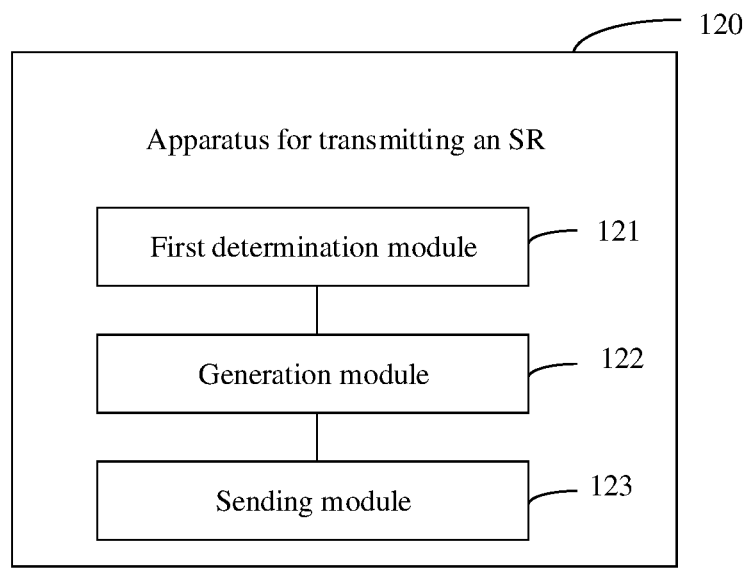
FIG. 11 illustrates a block diagram of an apparatus for transmitting an SR according to an exemplary embodiment.

FIG. 11 illustrates a block diagram of an apparatus 120 for transmitting an SR according to an exemplary embodiment. The apparatus 120 is applied to a terminal. As shown in FIG. 11, the apparatus 120 may include: a first determination module 121, configured to, before sending an SR to a base station through a PUCCH, determine, based on the SR and a PUCCH format for sending the SR, a preset parameter for generating an SR sequence, the preset parameter corresponding to a transmission manner of the SR and the PUCCH format, the transmission manner of the SR including that a first SR is transmitted, a second SR is transmitted and both the first SR and the second SR are transmitted simultaneously, and the first SR and the second SR being different types of SRs; a generation module 122, configured to generate the SR sequence based on the preset parameter; and a sending module 123, configured to send the SR sequence to the base station.

In a possible implementation, the preset parameter may include a preset cyclic shift and a preset information block, and the first determination module 121 may include: a first determination submodule, configured to determine, when the PUCCH format for sending the SR is a first predefined format, a preset cyclic shift corresponding to the transmission manner of the SR as the preset parameter for generating the SR sequence.

Optionally, the generation module 122 may include: a first generation submodule, configured to generate the SR sequence based on the preset cyclic shift, an initial cyclic shift corresponding to the first predefined format and a time-domain position of the SR sequence in an SR resource.

In a possible implementation, the preset parameter may include a preset cyclic shift and a preset information block, and the first determination module 121 may include: a second determination submodule, configured to determine, when the PUCCH format is a second predefined format, a preset information block corresponding to the transmission manner of the SR as the preset parameter for generating the SR sequence, the preset information block including at least two bits.

Figure 12:
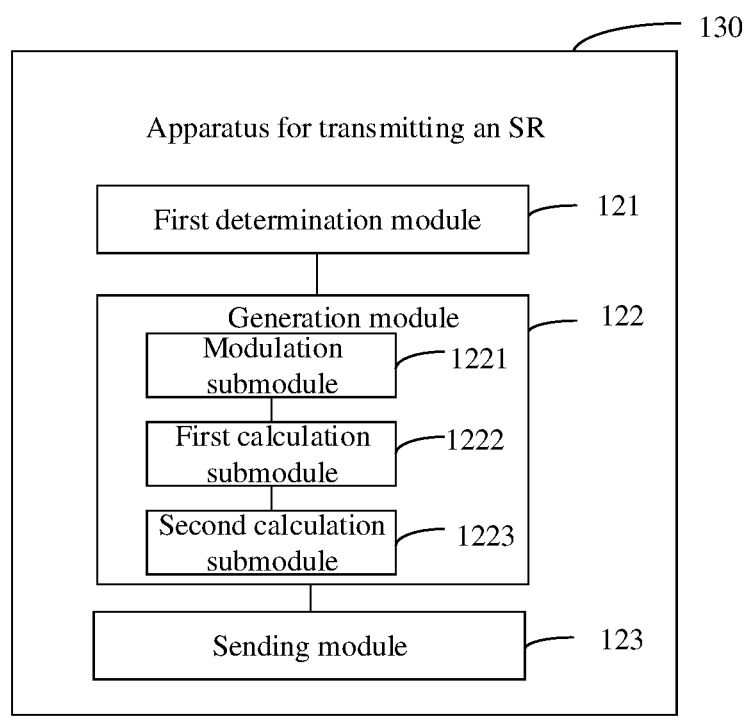
FIG. 12 illustrates a block diagram of an apparatus for transmitting an SR according to an exemplary embodiment.

FIG. 12 illustrates a block diagram of an apparatus 130 for transmitting an SR according to an exemplary embodiment. As shown in FIG. 12, in the apparatus 130, the generation module 122 may include: a modulation submodule 1221, configured to perform modulation on the preset information block to obtain a symbol; a first calculation submodule 1222, configured to calculate an original sequence based on the time-domain position of the SR sequence in the SR resource, an initial cyclic shift corresponding to the second predefined format and a preset quadrature sequence; and a second calculation submodule 1223, configured to multiply the original sequence by the symbol obtained by the modulation to obtain the SR sequence.

In a possible implementation, the apparatus 130 may further include: a receiving module, configured to receive control signaling sent by the base station, the control signaling indicating a type of each preset parameter corresponding to each predefined PUCCH format, and a value of each preset parameter corresponding to each transmission manner under each predefined PUCCH format.

In a possible implementation, the terminal may pre-store the type of each preset parameter corresponding to each predefined PUCCH format, and the value of each preset parameter corresponding to each transmission manner under each predefined PUCCH format.

In a possible implementation, the first SR may be an uplink SR and the second SR may be a BFRQ.

Figure 13:
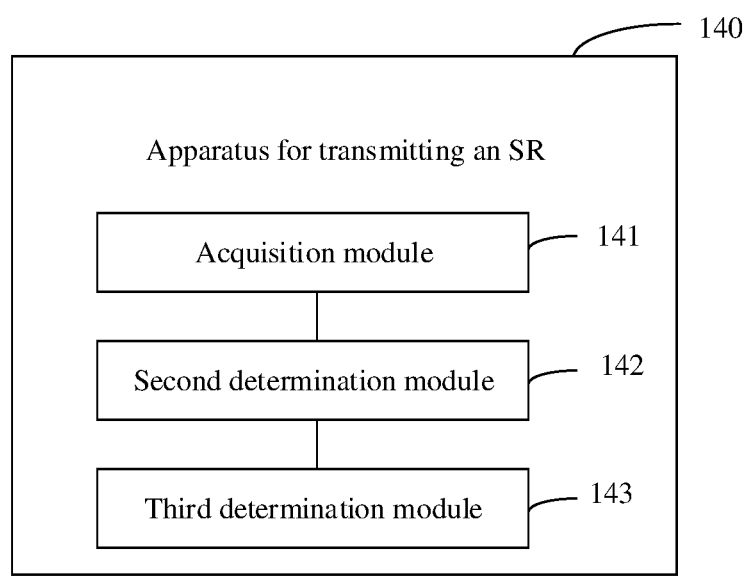
FIG. 13 illustrates a block diagram of an apparatus for transmitting an SR according to an exemplary embodiment.

FIG. 13 illustrates a block diagram of an apparatus 140 for transmitting an SR according to an exemplary embodiment. The apparatus 140 may be applied to a base station. As shown in FIG. 13, the apparatus 140 may include: an acquisition module 141, configured to acquire an SR sequence; a second determination module 142, configured to determine, based on the SR sequence and a PUCCH format for transmitting the SR sequence, a preset parameter for generating the SR sequence, the preset parameter corresponding to a transmission manner of the SR and the PUCCH format, the transmission manner of the SR including that a first SR is transmitted, a second SR is transmitted and both the first SR and the second SR are transmitted simultaneously, and the first SR and the second SR being different types of SRs; and a third determination module 143, configured to determine, based on the preset parameter, a content requested by a terminal sending the SR sequence.

Figure 14:
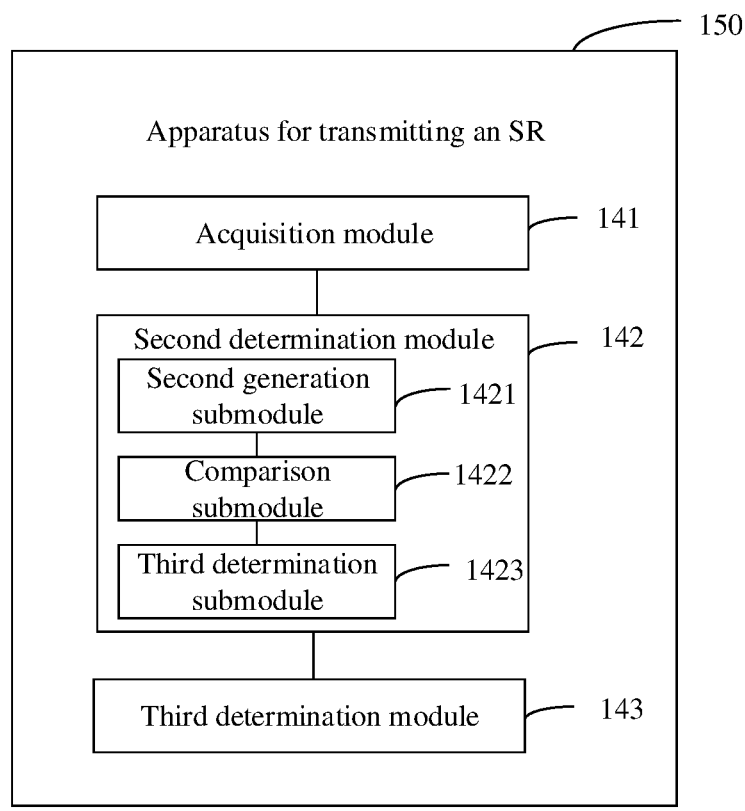
FIG. 14 illustrates a block diagram of an apparatus for transmitting an SR according to an exemplary embodiment.

In a possible implementation, the preset parameter may include a preset cyclic shift and a preset information block. FIG. 14 illustrates a block diagram of an apparatus 150 for transmitting an SR according to an exemplary embodiment. As shown in FIG. 14, in the apparatus 150, the second determination module 142 may include: a second generation submodule 1421, configured to generate at least one reference SR sequence based on at least one preset cyclic shift when the PUCCH format is a first predefined format; a comparison submodule 1422, configured to compare consistencies between reference SR sequences and the received SR sequence; and a third determination submodule 1423, configured to determine a preset cyclic shift corresponding to a reference SR sequence having the highest consistency with the received SR sequence as a preset cyclic shift for generating the received SR sequence.

Figure 15:
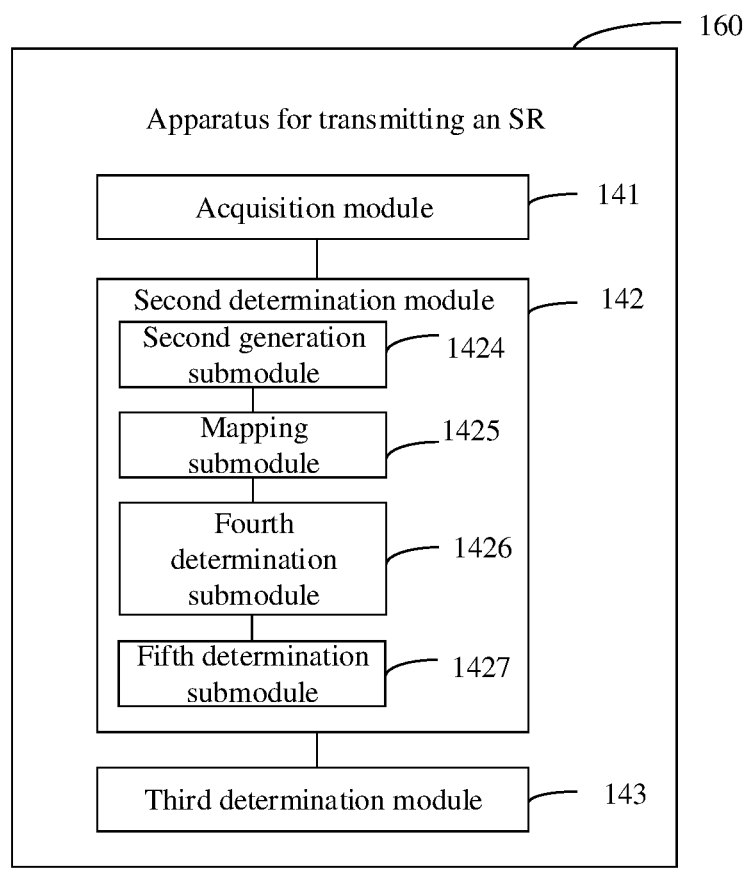
FIG. 15 illustrates a block diagram of an apparatus for transmitting an SR according to an exemplary embodiment.

In a possible implementation, the preset parameter may include a preset cyclic shift and a preset information block. FIG. 15 illustrates a block diagram of an apparatus 160 for transmitting an SR according to an exemplary embodiment. As shown in FIG. 15, in the apparatus 160, the second determination module 142 may include: an association submodule 1424, configured to associate the SR sequence with an original sequence when the PUCCH format is a second predefined format to obtain a target value; a mapping submodule 1425, configured to map the target value to a first constellation point in a constellation map; a fourth determination submodule 1426, configured to determine a second constellation point closest to the first constellation point among all standard constellation points in the constellation map, each standard constellation point corresponding to each preset information block, and the preset information block at least including two bits; and a fifth determination submodule 1427, configured to determine a preset information block corresponding to the second constellation point as an information block for generating the received SR sequence.

In a possible implementation, the apparatus may further include: a sending module, configured to send control signaling to the terminal, the control signaling including a predefined PUCCH format, the transmission manner of the SR and different preset parameters corresponding to each transmission manner.

In a possible implementation, the first SR may be an uplink SR and the second SR may be a BFRQ.

Figure 16:
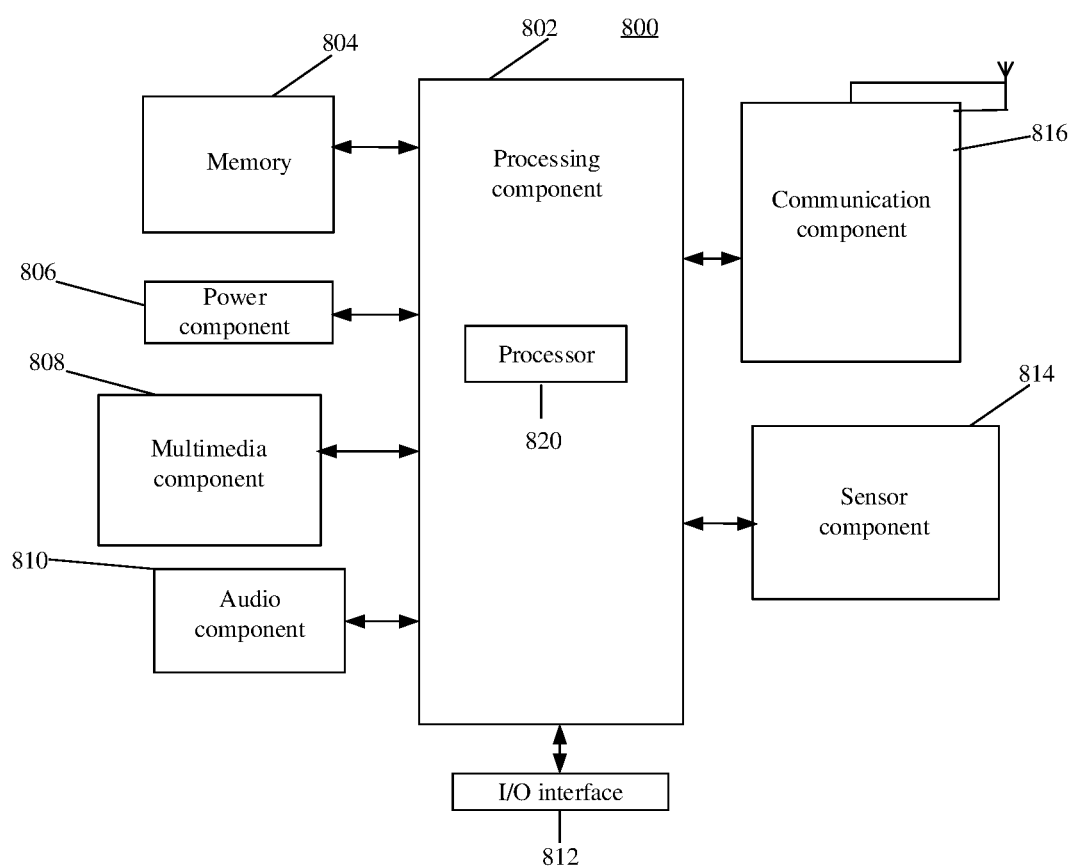
FIG. 16 illustrates a block diagram of an apparatus for transmitting an SR according to an exemplary embodiment.

FIG. 16 illustrates a block diagram of an apparatus 800 for transmitting an SR according to an exemplary embodiment. For example, the apparatus 800 may be a mobile phone, a computer, a digital broadcast terminal, a messaging device, a gaming console, a tablet, a medical device, exercise equipment, a Personal Digital Assistance (PDA), and the like.

Referring to FIG. 16, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 806 is configured to provide power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a Microphone (MIC) configured to receive an external audio signal when the apparatus 800 is in an operation mode, such as a call mode, a recording mode, and a voice recognition mode. The received audio signal may further be stored in the memory 804 or transmitted via the communication component 816. In some embodiments, the audio component 810 further includes a speaker configured to output audio signals.

The I/O interface 812 is configured to provide an interface between the processing component 802 and peripheral interface modules. The peripheral interface modules may be a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor, configured to detect the presence of nearby objects without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 may access a communication-standard-based wireless network, such as a Wireless Fidelity (WiFi) network, a 2nd-Generation (2G) or 3rd-Generation (3G) network or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the apparatus 800 may be implemented with one or more Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer readable storage medium including instructions is further provided, for example, the memory 804 includes the instructions. The instruction may be executed by the one or more processors 820 of the apparatus 800 to complete the above methods. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Figure 17:
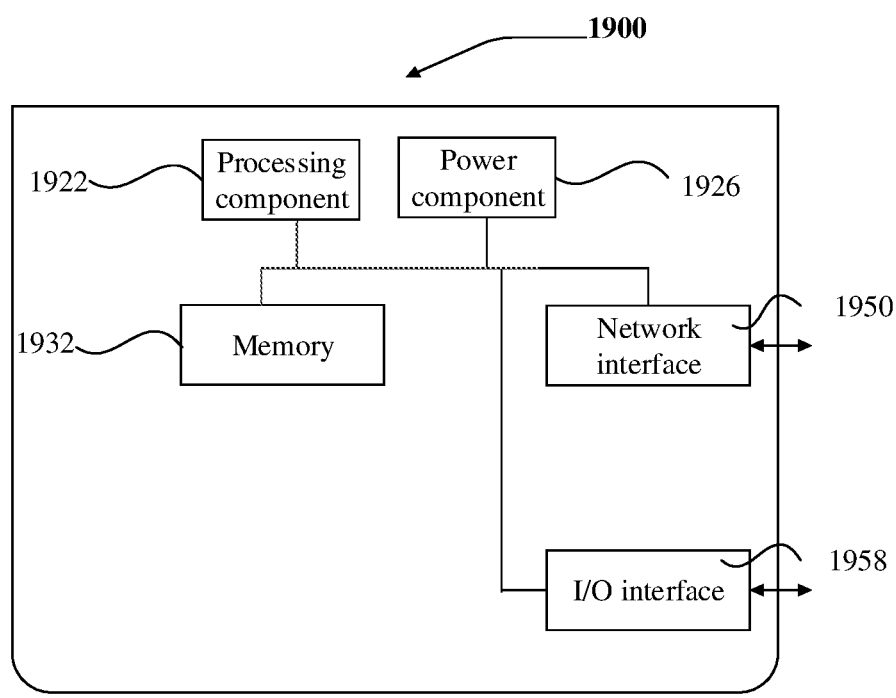
FIG. 17 illustrates a block diagram of an apparatus for transmitting an SR according to an exemplary embodiment.

FIG. 17 illustrates a block diagram of an apparatus 1900 for transmitting an SR according to an exemplary embodiment. For example, the apparatus 1900 may be provided as an application server. Referring to FIG. 17, the apparatus 1900 includes a processing component 1922 which further includes one or more processors, and a memory resource represented by a memory 1932 and configured to store instructions that may be executed by the processing component 1922, such as an application program. The application program stored in the memory 1932 may include one or more modules, with each module corresponding to a group of instructions. In addition, the processing component 1922 is configured to execute the instruction to execute the above method for transmitting an SR.

The apparatus 1900 may further include a power component 1926, configured to execute power management of the apparatus 1900, a wired or wireless network interface 1950 configured to connect the apparatus 1900 to the network, and an Input/Output (I/O) interface 1958. The apparatus 1900 may be operated based on an operating system stored in the memory 1932, for example, Windows Server™, Mac OS X™, Unix™, Linux™, FreeBSD™ or the like.

In an exemplary embodiment, a non-temporary computer readable storage medium including instructions is further provided, for example, the memory 1932 includes the instructions. The instructions may be executed by the processing component 1922 of the apparatus 1900 to implement the above methods. For example, the non-transitory computer-readable storage medium may be a Read Only Memory (ROM), a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for transmitting a Scheduling Request (SR), applied to a terminal, comprising:

determining, before sending the SR to a base station through a Physical Uplink Control Channel (PUCCH), based on the SR and a PUCCH format for sending the SR, a preset parameter for generating an SR sequence, wherein the preset parameter corresponds to a transmission manner of the SR and the PUCCH format, the transmission manner of the SR comprises: transmitting a first SR, transmitting a second SR and transmitting both the first SR and the second SR simultaneously, and the first SR and the second SR are different types of SRs;

generating the SR sequence based on the preset parameter; and sending the SR sequence to the base station, wherein the preset parameter comprises a preset cyclic shift and a preset information block, wherein determining, based on the SR and the PUCCH format for sending the SR, the preset parameter for generating the SR sequence comprises:

when the PUCCH format for sending the SR is a first predefined format, determining a preset cyclic shift corresponding to the transmission manner of the SR as the preset parameter for generating the SR sequence; or when the PUCCH format for sending the SR is a second predefined format, determining a preset information block corresponding to the transmission manner of the SR as the preset parameter for generating the SR sequence, the preset information block comprising at least two bits, wherein generating the SR sequence based on the preset parameter comprises:

performing modulation on the preset information block to obtain a symbol;

calculating an original sequence based on a time-domain position of the SR sequence in an SR resource, an initial cyclic shift corresponding to the second predefined format and a preset quadrature sequence; and multiplying the original sequence by the symbol obtained by the modulation to obtain the SR sequence.

2. The method of claim 1, wherein generating the SR sequence based on the preset parameter comprises:
generating the SR sequence based on the preset cyclic shift, an initial cyclic shift corresponding to the first predefined format and a time-domain position of the SR sequence in the SR resource.

3. The method of claim 1, further comprising:
receiving control signaling from the base station, wherein the control signaling indicates a type of each preset parameter corresponding to each predefined PUCCH format, and a value of each preset parameter corresponding to each transmission manner under each predefined PUCCH format.

4. The method of claim 1, wherein a type of each preset parameter corresponding to each predefined PUCCH format and a value of each preset parameter corresponding to each transmission manner under each predefined PUCCH format are pre-stored in the terminal.

5. The method of claim 1, wherein the first SR is an uplink SR, and the second SR is a Beam Failure Recovery Request (BFRQ).

6. A method for transmitting a Scheduling Request (SR), applied to a base station, comprising:
acquiring an SR sequence;
determining, based on the SR sequence and a Physical Uplink Control Channel (PUCCH) format for transmitting the SR sequence, a preset parameter for generating the SR sequence, wherein the preset parameter corresponds to a transmission manner of the SR and the PUCCH format, the transmission manner of the SR comprises: transmitting a first SR, transmitting a second SR and transmitting both the first SR and the second SR simultaneously, and the first SR and the second SR are different types of SRs; and
determining, based on the preset parameter, a content requested by a terminal sending the SR sequence,
wherein the preset parameter comprises a preset cyclic shift and a preset information block,
wherein determining, based on the SR sequence and the PUCCH format for transmitting the SR sequence, the preset parameter for generating the SR sequence comprises:
generating at least one reference SR sequence based on at least one preset cyclic shift when the PUCCH format is a first predefined format; comparing consistencies between the at least one reference SR sequence and the SR sequence; and determining a preset cyclic shift corresponding to a reference SR sequence of the at least one reference SR sequence having highest consistency with the SR sequence as a preset cyclic shift for generating the SR sequence; or
associating the SR sequence with an original sequence when the PUCCH format is a second predefined format to obtain a target value; mapping the target value to a first constellation point in a constellation map; determining a second constellation point closest to the first constellation point among all standard constellation points in the constellation map, wherein each standard constellation point of the standard constellation points corresponds to each preset information block, and each preset information block at least includes two bits; and determining a preset information block corresponding to the second constellation point as an information block for generating the SR sequence,
wherein the SR sequence is generated based on the preset parameter by:
performing modulation on the preset information block to obtain a symbol;
calculating the original sequence based on a time-domain position of the SR sequence in an SR resource, an initial cyclic shift corresponding to the second predefined format and a preset quadrature sequence; and
multiplying the original sequence by the symbol obtained by the modulation to obtain the SR sequence.

7. The method of claim 6, further comprising:
sending control signaling to the terminal, wherein the control signaling includes a predefined PUCCH format, the transmission manner of the SR and types of different preset parameters corresponding to different transmission manners.

8. The method of claim 6, wherein the first SR is an uplink SR, and the second SR is a Beam Failure Recovery Request (BFRQ).

9. An apparatus for transmitting a Scheduling Request (SR), comprising:
a processor; and
a memory, configured to store instructions executable by the processor,
wherein the processor is configured to implement operations of the method of claim 6.

10. An apparatus for transmitting a Scheduling Request (SR), comprising:
a processor; and
a memory, configured to store instructions executable by the processor,
wherein the processor is configured to:
before sending the SR to a base station through a Physical Uplink Control Channel (PUCCH), determine, based on the SR and a PUCCH format for sending the SR, a preset parameter for generating an SR sequence, wherein the preset parameter corresponds to a transmission manner of the SR and the PUCCH format, the transmission manner of the SR comprises: transmitting a first SR, transmitting a second SR and transmitting both the first SR and the second SR simultaneously, and the first SR and the second SR are different types of SRs;
generate the SR sequence based on the preset parameter; and
send the SR sequence to the base station,
wherein the preset parameter comprises a preset cyclic shift and a preset information block,
wherein the processor is further configured to:
when the PUCCH format for sending the SR is a first predefined format, determine a preset cyclic shift corresponding to the transmission manner of the SR as the preset parameter for generating the SR sequence; or
when the PUCCH format for sending the SR is a second predefined format, determine a preset information block corresponding to the transmission manner of the SR as the preset parameter for generating the SR sequence, the preset information block comprising at least two bits,
wherein the processor is further configured to:
perform modulation on the preset information block to obtain a symbol;

calculate an original sequence based on a time-domain position of the SR sequence in an SR resource, an initial cyclic shift corresponding to the second predefined format and a preset quadrature sequence; and multiply the original sequence by the symbol obtained by the modulation to obtain the SR sequence.

11. The apparatus of claim 10, wherein the processor is further configured to:

generate the SR sequence based on the preset cyclic shift, an initial cyclic shift corresponding to the first predefined format and a time-domain position of the SR sequence in the SR resource.

12. The apparatus of claim 10, wherein the processor is further configured to:

receive control signaling from the base station, wherein the control signaling indicates a type of each preset parameter corresponding to each predefined PUCCH format, and a value of each preset parameter corresponding to each transmission manner under each predefined PUCCH format.

\* \* \* \* \*